US007236473B2

(12) United States Patent
Haulk et al.

(10) Patent No.: US 7,236,473 B2
(45) Date of Patent: Jun. 26, 2007

(54) METHODS AND APPARATUS FOR AUTOMATIC ASSIGNMENT OF A COMMUNICATION BASE STATION AND TIMESLOT FOR AN ELECTRONIC SHELF LABEL

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 1122 days.

(21) Appl. No.: 10/044,688

(22) Filed: Jan. 11, 2002

(65) Prior Publication Data

US 2003/0133468 A1 Jul. 17, 2003

(51) Int. Cl.
*H04Q 7/00* (2006.01)
(52) U.S. Cl. ...................... 370/329; 370/347
(58) Field of Classification Search ............ 370/328, 370/329, 331, 337, 338, 347, 442
See application file for complete search history.

(56) References Cited

U.S. PATENT DOCUMENTS

| 5,150,362 | A  | * | 9/1992  | Akerberg ............... 370/331  |
| 5,588,043 | A  | * | 12/1996 | Tiedemann et al. ....... 455/435.1 |
| 5,634,193 | A  | * | 5/1997  | Ghisler ................. 455/440  |
| 6,188,913 | B1 | * | 2/2001  | Fukagawa et al. ........ 455/562.1 |
| 6,570,860 | B2 | * | 5/2003  | Hamalainen et al. ...... 370/329  |
| 6,574,211 | B2 | * | 6/2003  | Padovani et al. ........ 370/347  |
| 6,907,014 | B1 | * | 6/2005  | Kitade .................. 370/280  |
| 2004/0165550 | A1 | * | 8/2004 | Beach et al. ............ 370/328  |

* cited by examiner

*Primary Examiner*—Chau Nguyen
*Assistant Examiner*—Christine Ng
(74) *Attorney, Agent, or Firm*—Priest & Goldstein; Paul Martin

(57) ABSTRACT

An electronic price label (ESL) system with automatic assignment of an ESL to an appropriate CBS and timeslot is described. In one aspect, the ESL system automatically assigns a missing ESL to an appropriate CBS and timeslot following a successful find command. After a find command has been transmitted and responded to by the missing ESL, a host computer system has a record of the CBS nearest the ESL and the timeslot that the ESL responded on. The host computer then determines a new timeslot for use by the ESL. The new timeslot is one of the timeslots normally used by the nearest CBS for communication. The host computer may select a timeslot which is currently assigned to fewer ESLs, to allow for even distribution of messages across the timeslots. An assign command is then transmitted to the ESL on the current timeslot, instructing the ESL to change to new timeslot when listening for messages. The host computer system then updates an ESL data file to include the correct CBS and timeslot information. In one aspect of the present invention, the response to the find command may indicate that multiple CBSs are within range of the ESL. In addition to selecting the appropriate timeslot to assign to the ESL, the host computer will also select the appropriate CBS to assign to the ESL.

16 Claims, 5 Drawing Sheets

METHODS AND APPARATUS FOR AUTOMATIC ASSIGNMENT OF A COMMUNICATION BASE STATION AND TIMESLOT FOR AN ELECTRONIC SHELF LABEL

FIELD OF THE INVENTION

The present invention relates generally to improvements in electronic shelf label (ESL) systems used in transaction establishments. More specifically, the present invention relates to improvements in methods and apparatus for automatically assigning an ESL to an appropriate communication base station and timeslot.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs utilizing communication base stations (CBSs).

Communication between the CBSs and the ESLs is based on data being transferred utilizing a frame structure, with each frame being divided into timeslots. A typical retail establishment includes a plurality of CBSs, with groups of ESLs assigned to each CBS. Each ESL is associated with a particular CBS and assigned a particular timeslot, and listens for messages and transmits responses during that timeslot only, allowing a CBS to use different timeslots to communicate with different ESLs. A typical CBS may only use a subset of the available timeslots to communicate with ESLs during normal operation. If the ESL has been moved from its assigned physical location, the ESL may not be able to receive a message from the particular CBS that has been assigned to transmit messages to the ESL. Additionally, if the ESL has not been assigned a correct timeslot, the ESL may not be listening for messages at the appropriate time. Such situations effectively sever communication between the ESL and its associated CBS until the ESL can be found and corrective action taken. A suitable technique for automatically finding an ESL is described in U.S. application Ser. No. 10/044,439 entitled "Methods and Apparatus for Automatically Locating an Electronic Shelf Label" filed on the same date as the present application and incorporated by reference herein in its entirety. However, finding an ESL does not correct the problem of providing effective ongoing communication with the missing ESL. Therefore, it would be desirable to provide a system and method that automatically assigns an ESL to an appropriate CBS and timeslot after the ESL has been found.

SUMMARY OF THE INVENTION

The present invention advantageously provides methods and apparatus for an improved electronic shelf label (ESL) system. Among its several aspects, the present invention provides a technique for automatically assigning an ESL to an appropriate CBS and timeslot following a successful find command. After a find command has been transmitted and responded to by a missing ESL, a host computer system has a record of the CBS nearest the ESL and the timeslot that the ESL responded on. The host computer then determines a new timeslot for use by the ESL. The new timeslot is one of the timeslots normally used by the nearest CBS for communication. The host computer may selects a timeslot which is currently assigned to fewer ESLs, to allow for even distribution of messages across the timeslots, or select a timeslot based on the identification number of the ESL. An assign command is then transmitted to the ESL on the current timeslot, instructing the ESL to change to a newly assigned timeslot when listening for messages. The host computer system then updates an ESL data file to include the correct CBS and timeslot information.

In one aspect of the present invention, the response to the find command may indicate that multiple CBSs are within range of the ESL. In addition to selecting the appropriate timeslot to assign to the ESL, the host computer will also select the appropriate CBS to assign to the ESL.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2001 entitled "Methods and Apparatus for Performing Delta Updates of an Electronic Shelf Label", U.S. patent application Ser. No. 10/044,610 filed Jan. 11, 2001 entitled "Methods and Apparatus for Intelligent Data Bedcheck of an Electronic Shelf Label", U.S. patent application Ser. No. 10/044,020 filed Jan. 11, 2001 entitled "Methods and Apparatus for Reduced Electronic Shelf Label Power Consumption", U.S. patent application Ser. No. 10/044,535 filed Jan. 11, 2001 entitled "Methods and Apparatus for Error Detection and Correction of an Electronic Shelf Label System Communication Error", U.S. patent application Ser. No. 10/044,439 filed Jan. 11, 2001 entitled "Methods and Apparatus for Automatically Locating an Electronic Shelf Label", U.S. patent application Ser. No. 10/044,687 filed Jan. 11, 2001 entitled "Methods and Apparatus for Conserving Battery Power in an Electronic Shelf Label System", U.S. patent application Ser. No. 10/044,440 filed Jan. 11, 2001 entitled "Methods and Apparatus for Error Detection and Correction in an Electronic Shelf Label System", all of which are assigned to the assignee of the present invention and incorporated by reference herein in their entirety.

Figure 1:
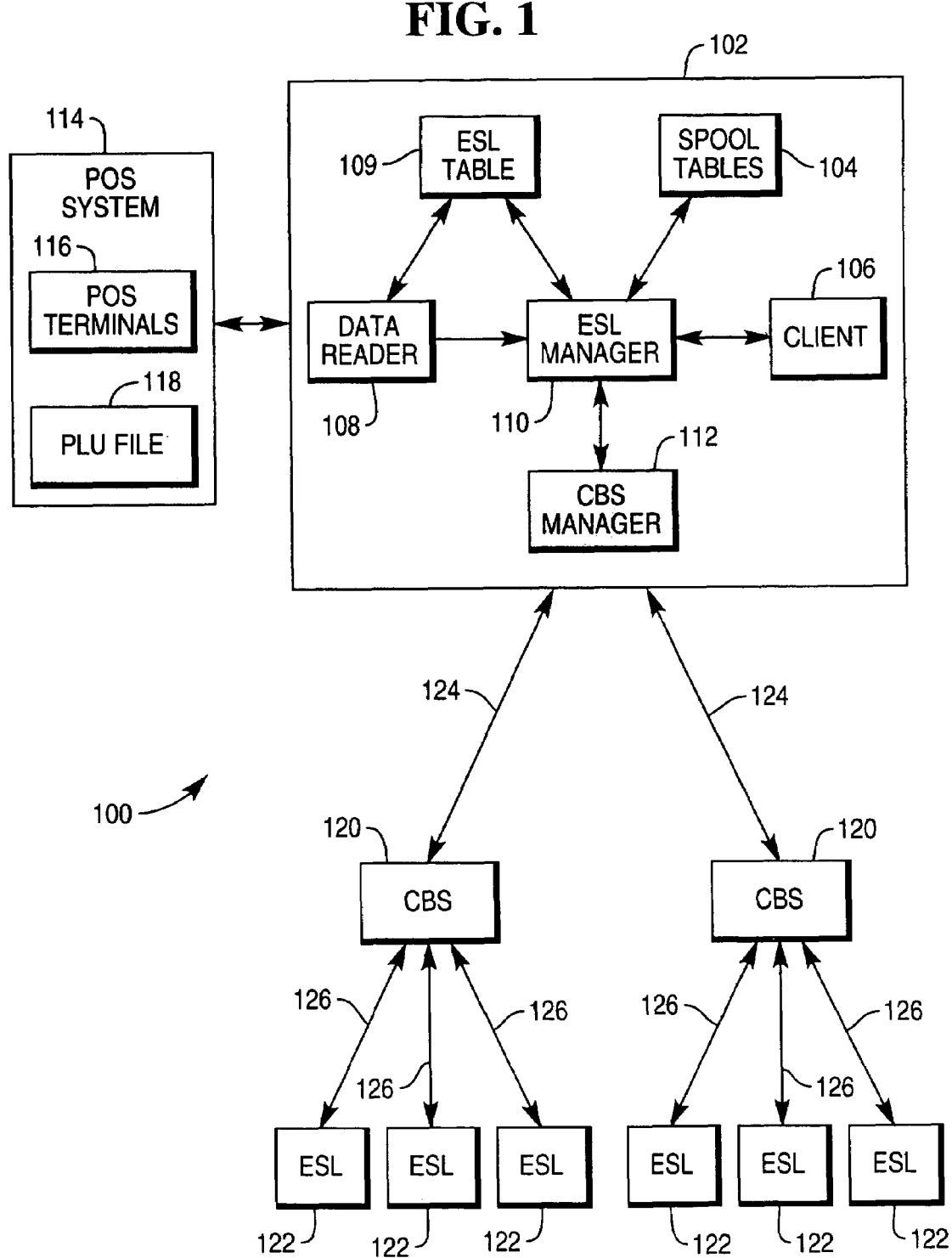
FIG. 1 shows a block diagram of a transaction management system in accordance with the present invention.

FIG. 1 shows a transaction management system 100 in accordance with the present invention. The system 100 includes an ESL computer system 102 and a point-of-service (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS) manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 assigned to one the CBSs 120. A record of this assignment relationship is stored in system memory, for example, as part of the data stored in the ESL data file 109.

The ESL manager 110 records and schedules messages to the ESLs 122. The ESL manager 110 monitors and maintains an action list for the ESLs 122 utilizing spool tables 104, and provides a scheduling function for time related events which need to occur at a future point at time. Items on the action list may be provided from client components as requests for work, may be automatically generated by the ESL manager 110, or could be due to requests that required additional processing at a later date, such as, for example, a series of sale prices to be represented at the ESLs at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS Manager 120, the ESL Manager 112 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving messages, the ESLs 122 transmit responses to CBSs 120 over communication links 126. The CBSs 120 would then process and retransmit the response messages to the CBS manager 112 over communication links 124. The CBSs 120 may also detect the signal strength of the responses and report the signal strengths to the host computer system 102.

The ESL data file 109 consists of multiple records, with each record corresponding to a particular ESL 122 in a retail establishment. The record for each ESL 122 includes a number of fields, with each field containing the data which is supposed to be in one of the registers of the ESL 122. Thus, the record contains a picture, or data image, of what data is intended to be stored in the ESL 122, and consequently what the ESL 122 should be displaying. Additionally, each record may include a variety of additional information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
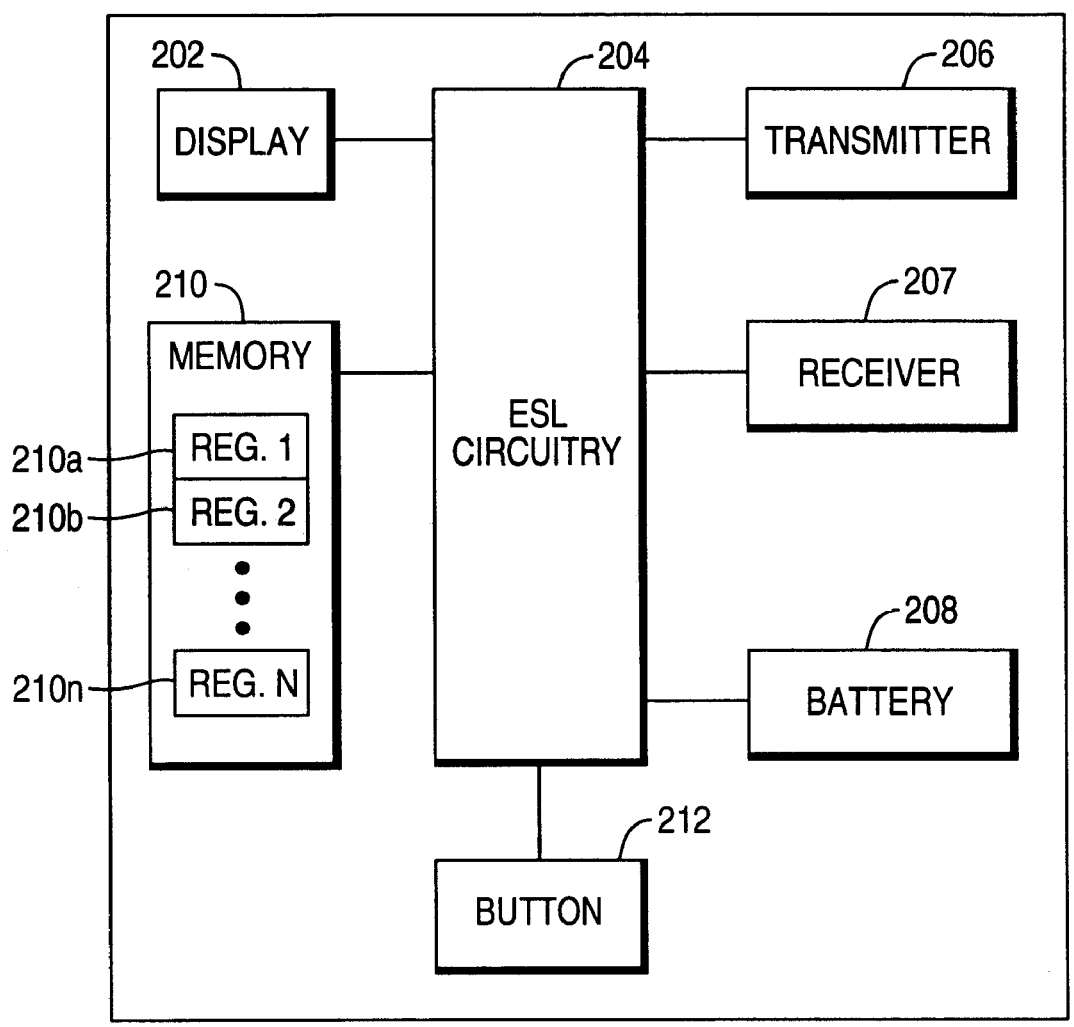
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, such as registers 210a, 210b, . . . , 210n. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

As described above, each ESL 122 is associated with a particular CBS 120 which transmits messages to the ESL 122 and listens for responses. Each CBS 120 in a retail establishment transmits messages to and receives responses from groups of ESLs 122 assigned to the particular CBS 120. In a preferred embodiment, communication between the CBSs 120 and the ESLs 122 is divided into frames, with each frame being 1.45 seconds. Each frame is further divided into 24 timeslots, with each timeslot being 60.42 milliseconds. In addition to being associated with a particular CBS 120, each ESL 122 is associated with a particular timeslot and listens for messages and transmits responses during that timeslot only. Each CBS 120 may suitably support two timeslots for the transmission and reception of messages during normal operation.

Figure 3:
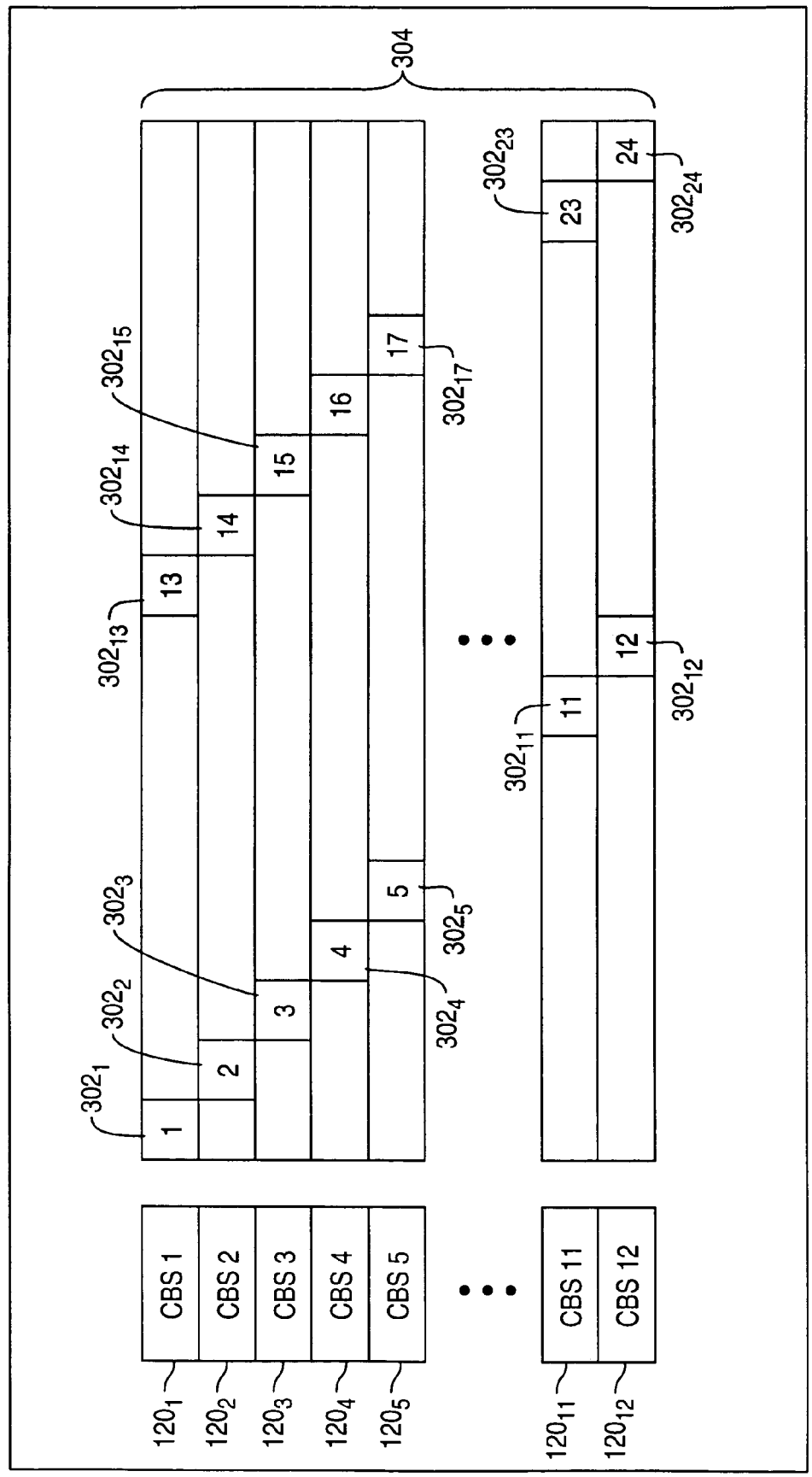
FIG. 3 shows an exemplary frame and timeslot assignment in accordance with the present invention.

FIG. 3 shows an exemplary timing diagram 300 for a system employing twelve CBSs $120_1$, $120_2$, $120_3$, ..., $120_{11}$, $120_{12}$ showing twenty-four timeslots $302_1$, $302_2$, $302_3$, ..., $302_{23}$, $302_{24}$ for a frame 304. As seen in FIG. 3, the CBS $120_4$, for example, is assigned to the timeslot $302_4$ and the timeslot $302_{16}$. Thus, if a particular ESL 122 has been assigned to the CBS $120_4$ and the timeslot $302_{16}$, that ESL 122 will receive messages from and transmit responses to the CBS $120_4$ only during the timeslot $302_{16}$.

Figure 4:
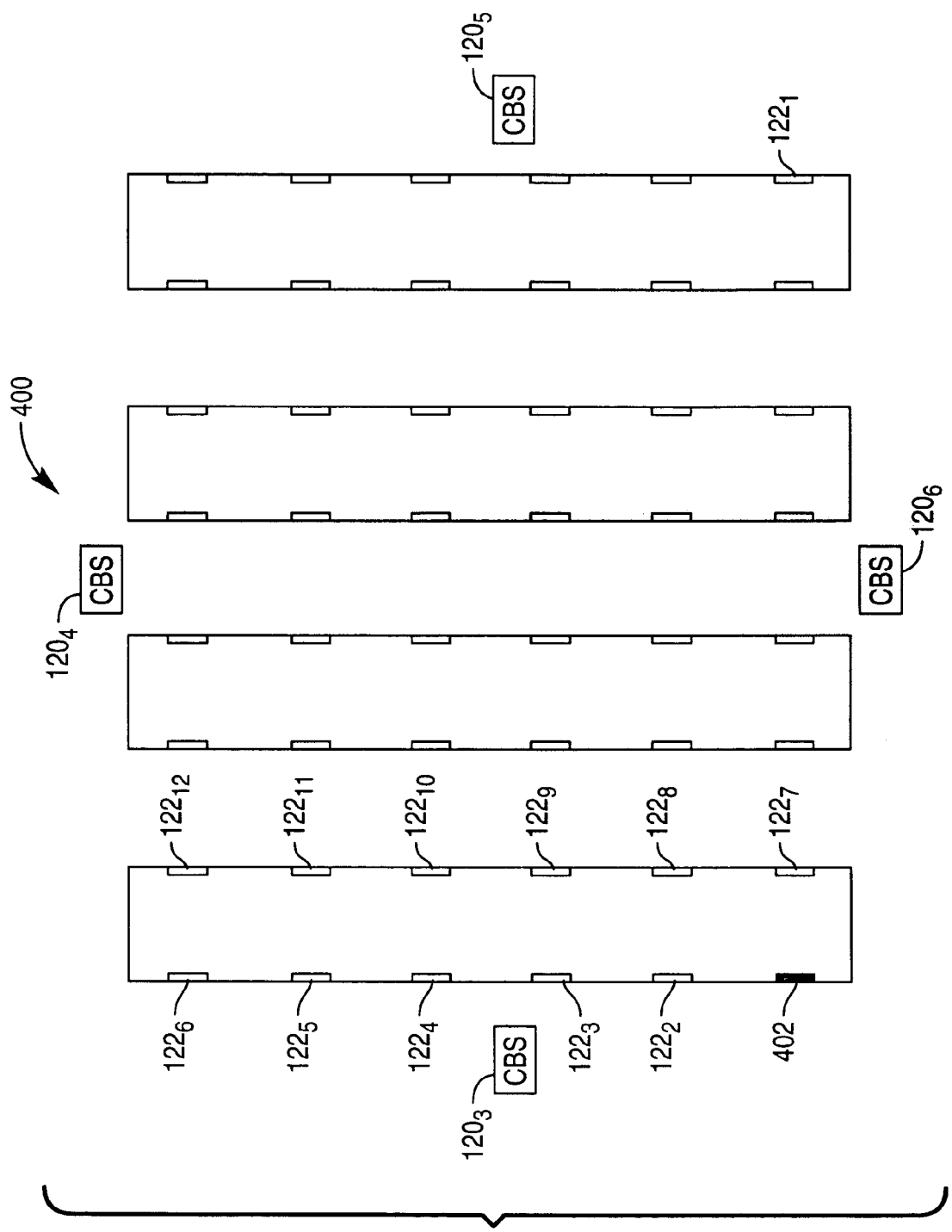
FIG. 4 shows an exemplary retail establishment floor layout in accordance with the present invention.

In certain situations, an ESL may not be able to communicate with its assigned CBS. For example, as seen in the simplified floor diagram 400 of FIG. 4 which shows a portion of a retail establishment, assume that ESLs $122_1$, $122_2$, $122_3$, ..., $122_{11}$, $122_{12}$ are assigned to communicate with the CBS $120_3$, and that the ESL $122_1$ has been assigned to communicate utilizing the timeslot $302_3$. Initially, the ESL $122_1$ was located on a shelf in slot 402 adjacent to the ESL $122_2$, and was in communication range of its assigned CBS $120_3$. The ESL $122_1$ was then moved to another location outside the communication range of the CBS $120_3$, but within the communication range of CBS $120_5$. Such a movement may occur due to, for example, the relocation of the product associated with the ESL $122_1$, as retail establishments periodically rearrange their product placements to optimize sale opportunities. Alternatively, the ESL $122_1$ may not have been assigned to the correct timeslot or to the correct CBS $120_3$, due to, for example, having factory preset conditions which are not appropriate to actual store conditions. Any messages transmitted by the CBS $120_3$ will not be received by the ESL $122_1$. U.S. patent application Ser. No. 09/428,428 titled "Methods and Apparatus for Automatically Locating an Electronic Price Label", and incorporated by reference herein, describes a technique for locating the ESL $122_1$ which is not responding to messages from its assigned CBS $120_3$.

After a number of retries to the ESL $122_1$ have gone unanswered, the host computer system 102 causes all CBSs 120 to transmit an automatic find on all timeslots directed to the ESL $122_1$ which is not responding. If the ESL $122_1$ responds to the automatic find command, the host computer system 102 logs which CBS 120 heard the response and which timeslot the ESL responded on. In the system shown in FIG. 4, the CBS $120_5$ will report that a response from the ESL $122_1$ was received on the timeslot $302_3$. In one aspect of the present invention, if the response is heard by more than one CBS 120, such as CBS $120_5$ and CBS $120_6$, the host computer 102 logs the CBS 120 which received the strongest response signal.

The present invention provides a technique for automatically assigning an ESL, such as ESL $122_1$, to an appropriate CBS, such as CBS $120_5$, and timeslot, such as timeslot $302_5$, following a successful find command. As shown in the above example, after a find command has been transmitted and responded to by the missing ESL $122_1$, the host computer system 102 has a record of the CBS nearest the ESL $122_1$, CBS $120_5$, and the timeslot $302_3$ that the ESL $122_1$ responded on. The host computer 102 then determines a new timeslot for use by the ESL $122_1$. The new timeslot is one of the timeslots normally used by the CBS $120_5$ for communication, such as timeslot $302_5$ or timeslot $302_{17}$. In a preferred embodiment, the host computer 102 selects a timeslot which is currently assigned to fewer ESLs 122, to allow for even distribution across the timeslots. If we assume timeslot $302_5$ is that slot, then an assign command is transmitted to the ESL $122_1$ on timeslot $302_3$, instructing the ESL to change to timeslot $302_5$ when listening for messages. The host computer system 102 then updates the ESL data file 109 to include the correct CBS and timeslot information.

In one aspect of the present invention, the response to the find command may indicate that multiple CBSs 120 are within range of the ESL $122_1$. In addition to selecting the appropriate timeslot to assign to the ESL $122_1$, the host computer 102 will also select the appropriate CBS to assign to the ESL $122_1$. Returning to the above example, if CBS $120_5$ and CBS $120_6$ both receive the response to the find and the CBS $120_5$ received the strongest signal from the the ESL $122_1$, host computer system 102 will typically assign the CBS $120_5$ to the ESL $122_1$. However, if the CBS $120_5$ is assigned to more ESLs 122 than CBS $120_6$, then the host computer system may assign the ESL $122_1$ to CBS $120_6$ in order to help ensure even distribution of the ESLs across the CBSs and timeslots of the retail establishment to provide for optimum performance.

Figure 5:
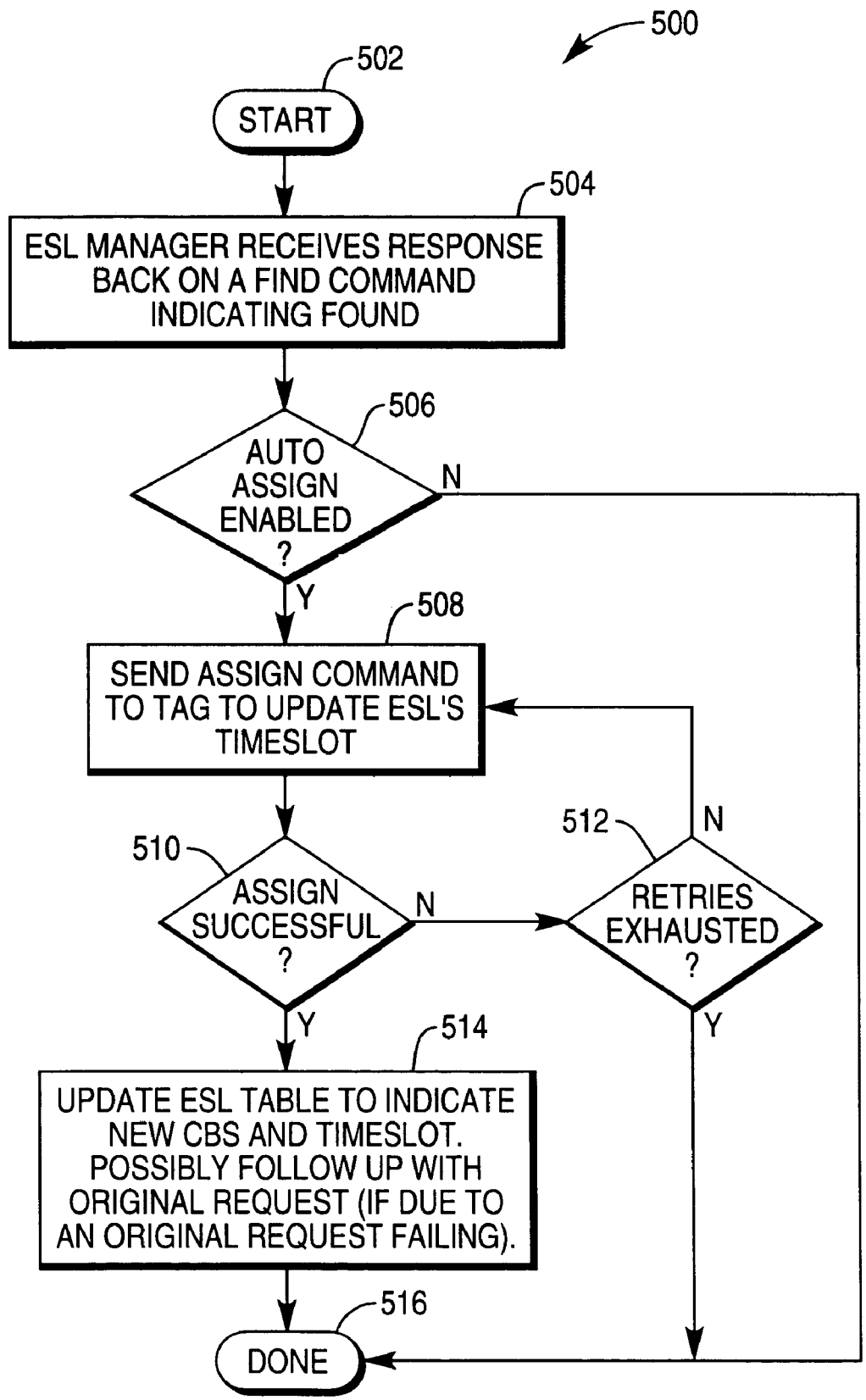
FIG. 5 shows a method of automatically assigning an ESL to an appropriate CBS and timeslot in accordance with the present invention.

FIG. 5 shows a method 500 of automatically assigning an ESL to an appropriate CBS and timeslot after a successful find. In step 502, the method starts. In step 504, the ESL manager receives a message indicating that a missing ESL has been located in response to a find command. The message to the ESL manager includes the identification number of the CBS which is nearest the ESL, the timeslot on which the ESL responded to the find command, and the timeslots currently supported by the CBS nearest the ESL. In step 506, the ESL manager determines if an automatic assignment option is enabled. If the automatic assignment option is not enabled, an indication may be provided for store employees and the method continues to step 516 and ends. If the automatic find option is enabled, the method continues to step 508. In step 508, the ESL manager instructs the CBS manager to send an assign command to the ESL. The assign command tells the ESL which timeslot the ESL should be listening on. In one aspect of the present invention, if the CBS manager receives a garbled response or no response from the ESL, the CBS manager may retry the assign command a predetermined number of times. If the CBS manager continues to receive a garbled response or no response from the ESL in response to the retransmissions of the assign command, the CBS manager may assume the assign command was successful.

In step 510, the ESL manager waits for an indication that the assign was successful. If the assignment of the ESL was not successful, a retry count is incremented and the method continues to step 512. In step 512, the ESL manager determines if the assign command has been attempted a predetermined number of times. If the assign command has been attempted a predetermined number of times, the method continues to step 516 and ends. If the assign command has not been attempted a predetermined number of times, the method returns to step 508.

Returning to step 510, if the assign was successful, the method continues to step 514. In step 514, the ESL manager updates the ESL table to indicate the new CBS and timeslot assigned to the ESL. Optionally, the ESL manager may also transmit another message to the ESL which had been pending. For example, if the find command had been issued due to the ESL not responding to a bedcheck message, that bedcheck message may now be transmitted to the ESL using the new CBS and timeslot assignment. In step 516, the method ends.

In one aspect, the present invention allows store personnel to relocate items and the associated ESLs 122 without having to log the movement with the host system 102. After an item and ESL 122 have been relocated, the host computer can detect the movement using a technique, such as a bedcheck and an automatic find, to locate the ESL 122 which has been moved. The host computer 102 may then automatically reassign the ESL 122. Thus, clerks and other store employees may easily relocate products and their associated ESLs.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A communication method for an electronic shelf label (ESL) system utilizing frames divided into a plurality of timeslots, the method comprising the steps of:
    (a) transmitting a find message to an ESL by a host computer, said find message transmitted by a plurality of communication base stations (CBSs) utilizing every timeslot of a frame so that each CBS repeats the find message across all timeslots of a frame in order to insure that each CBS will transmit a find message in the timeslot being used by the ESL;
    (b) logging which CBS or CBSs received a response returned by the ESL in response to the find message, and logging the timeslot in which the response was received;
    (c) determining a new CBS assignment and a new timeslot assignment for the ESL;
    (d) transmitting an assign command to the ESL utilizing the timeslot in which the response was received instructing the ESL to listen for messages on the new timeslot.

2. The method of claim 1 further comprising the step of:
    (e) updating an ESL data file with the new CBS assignment and new timeslot assignment information.

3. The method of claim 2 wherein step (a) was initiated as a result of the ESL not responding to a message, and the method further comprises the step of:
    (f) retransmitting the message to the ESL utilizing the new CBS and the new timeslot.

4. The method of claim 1 wherein step (a) further comprises the substep of:
    sending a command from an ESL manager software module to a CBS manager software module instructing the CBS manager software to transmit the find message.

5. The method of claim 1 wherein step (c) further comprises the substep of:
    if the response to the find message is received by more than one CBS, identifying which CBS received the response with the strongest signal strength, and identifying which CBS currently has the least ESL assignments.

6. The method of claim 5 wherein step (c) further comprises the substep of:
    if the response to the find message is received by more than one CBS, assigning the ESL to the CBS which received the response with the strongest signal strength.

7. The method of claim 5 wherein step (c) further comprises the substep of:
    if the response to the find message is received by more than one CBS, assigning the ESL to the CBS which currently has the least ESL assignments.

8. An electronic shelf label (ESL) system comprising:
    an ESL for displaying information,
    a plurality of communication base stations (CBSs) communicatively connected to a host computer;
    a host computer for initiating transmission of a find message to the ESL, said find message transmitted by the plurality of CBSs utilizing every timeslot of a frame so that each CBS repeats the find message across all timeslots of a frame in order to insure that each CBS will transmit a find message in the timeslot being used by the ESL, logging which CBS or CBSs received a response returned by the ESL in response to the find message, and logging the timeslot in which the response was received, determining a new CBS assignment and a new timeslot assignment for the ESL, and transmitting an assign command to the ESL utilizing the timeslot in which the response was received instructing the ESL to listen for messages on the new timeslot.

9. The system of claim 8 wherein the host computer updates an ESL data file with the new CBS assignment and new timeslot assignment information.

10. The system of claim 9 wherein the transmission of the find message was initiated as a result of the ESL not responding to a message, and the host computer is further operative to retransmit the message to the ESL utilizing the new CBS and the new timeslot.

11. The system of claim 8 wherein the host computer includes an ESL manager and a CBS manager, wherein the ESL manager sends a command to a CBS manager software module instructing the CBS manager software module to transmit the find message.

12. The system of claim 8 wherein, if the response to the find message is received by more than one CBS, the host computer identifies which CBS received the response with the strongest signal strength, and identifies which CBS currently has the least ESL assignments.

13. The system of claim 12 wherein, if the response to the find message is received by more than one CBS, the host computer assigns the ESL to the CBS which received the response with the strongest signal strength.

14. The system of claim 12 wherein, if the response to the find message is received by more than one CBS, the host computer assigns the ESL to the CBS which currently has the least ESL assignments.

15. An electronic shelf label (ESL) update method to allow for ESL relocation in a retail establishment including an ESL system utilizing frames divided into a plurality of timeslots, the method comprising the steps of:
    (a) relocating an ESL and items associated with the ESL from a first location in a retail establishment to a second location in the retail establishment;
    (b) transmitting a message to the ESL by a host computer, said message transmitted by one of a plurality of communication base stations (CBSs) utilizing one of the timeslots of a frame, said CBS being the CBS that was assigned to the ESL when the ESL was in the first location in the retail establishment;

(c) waiting for a response to the message;

(d) if no response is received by the host computer, transmitting a find message, said find message transmitted by all of the plurality of CBSs utilizing every timeslot of a frame so that each CBS repeats the find message across all timeslots of a frame in order to insure that each CBS will transmit a find message in the timeslot being used by the ESL;

(e) logging which CBS or CBSs received a response to the find message and logging the timeslot in which the response to the find message was received;

(f) determining a new CBS assignment and a new timeslot assignment for the ESL; and (g) transmitting an assign command to the ESL utilizing the timeslot in which the response was received instructing the ESL to listen for messages on the new timeslot.

16. The method of claim 15 wherein the step of relocating the ESL removed the ESL from within communication range of the currently assigned CBS.

* * * * *